Dec. 13, 1960  D. W. SHERMAN  2,964,331
VEHICLE FRAME
Filed Feb. 4, 1958  2 Sheets-Sheet 1
FIG. 1.
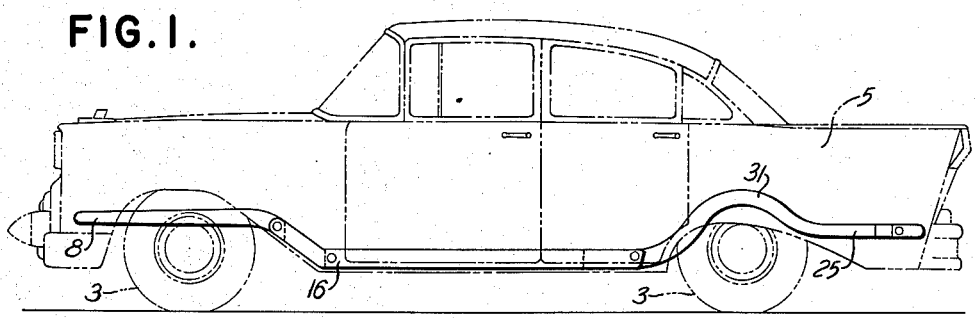
FIG. 2.
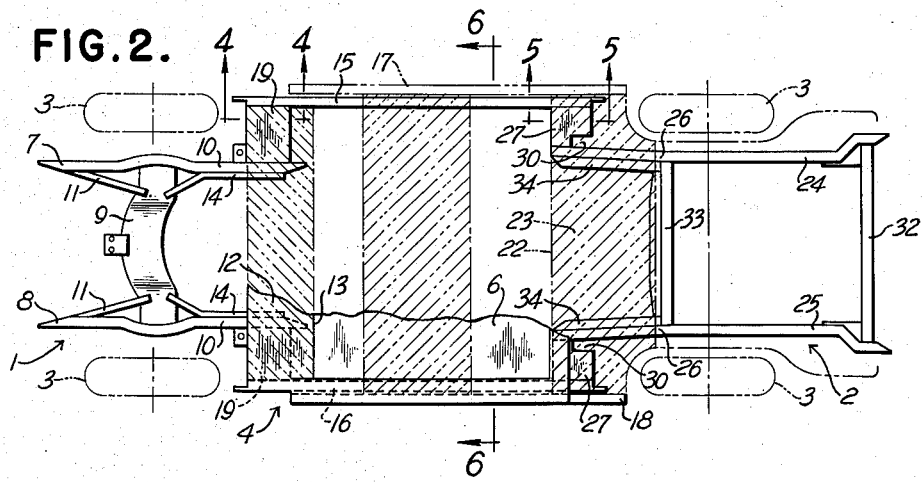
FIG. 3.
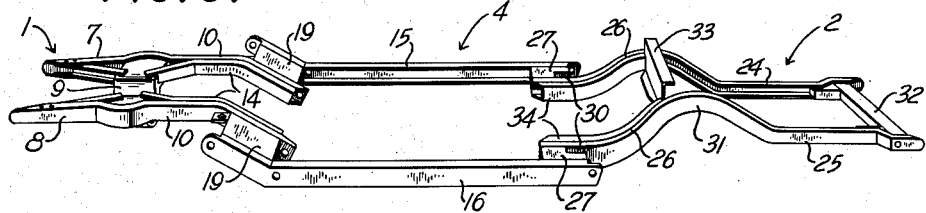
FIG. 4.   FIG. 5.
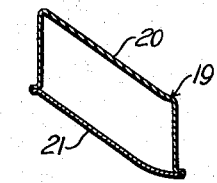 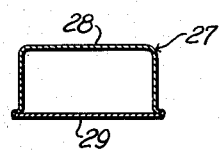
INVENTOR.
DONALD W. SHERMAN
BY
Andrus & Starke
Attorneys Dec. 13, 1960     D. W. SHERMAN     2,964,331
VEHICLE FRAME Filed Feb. 4, 1958                                                                  2 Sheets-Sheet 2

INVENTOR.
DONALD W. SHERMAN
BY
Andrus & Starke
Attorneys

United States Patent Office 2,964,331
Patented Dec. 13, 1960

2,964,331

VEHICLE FRAME

Donald W. Sherman, Milwaukee, Wis., assignor to A. O. Smith Corporation, Milwaukee, Wis., a corporation of New York Filed Feb. 4, 1958, Ser. No. 713,177

7 Claims. (Cl. 280—106)

This invention relates to a vehicle frame which is primarily adapted for use in passenger vehicles.

In passenger vehicles the trend has been toward ever lower silhouettes. In vehicles employing a relatively narrow conventional box type frame wherein the body floor extends over the frame the silhouette has now been reduced about as far as is possible and yet retain adequate passenger seating accommodation. Efforts to further reduce the silhouette appear to require that the body floor be moved down toward the level of minimum ground clearance. To make this possible frames of considerably different design have been employed.

One such design includes the so-called cruciform or backbone frame comprising generally a longitudinal tubular member having forwardly and rearwardly diverging rails. This frame construction permits lowering of the floor to minimum ground clearance with the limitation that a triangular shaped restriction in both front and rear floors are necessary to accommodate portions of the diverging rails. Another design includes the so-called wide box section frame having outwardly curved one-piece rails which permit the floor to be lowered through certain areas of the frame. In both of these designs, then, the frame imposes some limitations upon a complete lowering of the floors within the frame to the level of minimum ground clearance. It is an object of this invention, therefore, to provide a frame construction which is completely clear of the floor and permits lowering of the floor toward the level of minimum ground clearance between the toe board area and the rear seat area of the vehicle.

The vehicle frame structure of this invention comprises, broadly, relatively narrow forward and rearward portions and a wider portion intermediate the forward and rearward portion. Rearwardly the side rails of the narrow forward portion bend downwardly generally to the level of minimum ground clearance in the area of the floor toe board and terminate forwardly of the toe board. The side rails of the intermediate portion are disposed generally at the level of minimum ground clearance and are spaced outwardly from the rails of the forward portion to a position adjacent to the body sills. The forward ends of the intermediate rails bend upwardly in the toe board area and parallel the rear portion of the forward rails.

A relatively wide tubular or box section offset member extends normal to and connects the parallel portions of the forward and intermediate rails. Rearwardly the rails of the intermediate portion extend past the forward edge of the rear seat. The side rails of the frame rearward portion are spaced inwardly from the intermediate rails and extend rearwardly from a position to the rear of forward edge of the rear seat.

The rails of the rearward portion parallel the rearward end of the intermediate rails in the rear seat area generally at the level of minimum ground clearance before bending upwardly to accommodate the rear axle of the vehicle. The parallel portions of the rearward and intermediate rails are also connected by relatively wide tubular or box section offset members extending normal to the rails. Thus, the invention provides a vehicle frame which permits the floor of a separate body to be lowered toward the level of minimum ground clearance between the toe board and the forward edge of the rear seat without any limitation imposed by the frame.

The accompanying drawings illustrate the best mode presently contemplated for carrying out the invention.

In the drawings:

Figure 1 is a side elevation of the vehicle frame of this invention and shows a separate body in phantom lines supported thereon;

Fig. 2 is a plan view of the frame of this invention and shows the floor area of a separate body in phantom lines as the same is mounted on the frame;

Fig. 3 is a perspective view of the frame of this invention;

Fig. 4 is an enlarged section taken on line 4—4 of Fig. 2;

Fig. 5 is an enlarged section taken on line 5—5 of Fig. 2;

Figure 6:
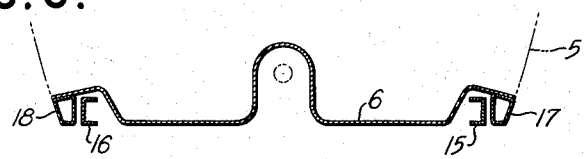
Fig. 6 is a section taken through the frame on line 6—6 of Fig. 2 showing how the floor of the separate body may be lowered toward the level of minimum ground clearance completely clear of the frame.

The vehicle frame shown in the drawings comprises generally the relatively narrow-forward and rearward portions 1 and 2 respectively, adapted to be disposed and supported between the transversely spaced wheels 3 shown in phantom lines, and a relatively wide intermediate portion 4 between the forward and rearward portions. The frame is adapted to receive and support a separate body 5 shown generally in phantom lines in Fig. 1 including the floor 6.

The forward portion 1 of the vehicle frame comprises a pair of transversely spaced and generally horizontally extending side rails 7 and 8 connected by the usual front cross bar assembly 9. Each of the side rails 7 and 8 includes a channel section outer rail 10 disposed with the flanges thereof extending inwardly. Braces 11 extend angularly between the outer rails 10 and the cross bar assembly 9 and serve to strengthen and rigidify the extreme forward portion of the frame.

In the area of the floor toe board 12, shown cross-hatched in Fig. 2, the rear portion of outer rails 10 bends downwardly at an angle corresponding generally to the angle of the toe board and terminates forwardly of rear edge 13 of the toe board generally at the level of minimum ground clearance for the vehicle.

To further strengthen and rigidify forward frame portion 1, side rails 7 and 8 are boxed rearwardly of the front cross bar assembly 9 by the addition of a channel section inner rail 14 having flanges disposed outwardly and joined to the flanges of outer rails 10.

The intermediate portion 4 of the frame comprises generally a pair of transversely spaced side bars 15 and 16 which are spaced outwardly of side rails 7 and 8, respectively, and are disposed parallel and just inboard to the body side sills 17 and 18 respectively of vehicle body 5. Side bars 15 and 16 are generally straight horizontally extending channel members having flanges directed inwardly and are disposed at the level of minimum ground clearance. The forward end of side bars 15 and 16 longitudinally overlap the rear portion of side rails 7 and 8 and bend upwardly beneath the toe board 12 at an angle parallel to the downwardly bent end of the respective side rails.

The downwardly extending end portions of side rails 7 and 8 are respectively connected to the corresponding upwardly extending end portions of side bars 15 and 16 by means of right angle offset members 19. The offset members 19 constitute wide generally parallelogram-shaped tubular or box section members having a relatively large cross-section as shown in Fig. 4. The upper and lower surfaces 20 and 21 of member 19 are spaced to correspond to the spacing between the flanges of the corresponding portions of side rails 7 and 8 and side bars 15 and 16, and their width substantially exceeds their height.

Members 19 are welded to the outside of the boxed portions of rails 7 and 8 respectively and to the inwardly disposed flanges of the corresponding portions of side bars 15 and 16 respectively. The large cross-section of members 19 provides a connecting structure having considerable torsional rigidity and serves to reduce frame deflection due to the offset and to transmit body rigidity inwardly to stiffen the ends of the frame.

Rearwardly the side bars 15 and 16 extend beyond the front edge 22 of the rear seat area 23 shown cross-hatched in Fig. 2, and longitudinally overlap the rear side rails 24 and 25, respectively, of rearward frame portion 2. The rear side rails 24 and 25 each comprise a channel section outer rail 26 having inwardly disposed flanges and are spaced inwardly from side bars 15 and 16 and extend rearwardly from the front edge 22 of the rear seat area 23. The forward end portions of outer rails 26 are disposed at the level of minimum ground clearance and therefore generally parallel the respective side bars 15 and 16.

The generally rectangular tubular or box-section offset members 27 extend at right angles between the overlapped portions of the respective outer rails 26 and corresponding side bars 15 and 16. Like offset members 19, the members 27 have a relatively large cross-section as shown in Fig. 5 and the upper and lower surfaces 28 and 29 are spaced to correspond to the flange spacings of side bars 15 and 16 and outer rail 26. The offset members 27 are welded respectively to the outside of outer rails 26 and to the inwardly extending flanges of side bars 15 and 16. As best shown in Fig. 2, each offset member 27 is provided with a recess 30 which opens rearwardly adjacent to outer rails 26. The recess 30 is adapted to receive one end of a leaf spring, not shown, which is generally employed in rear wheel suspensions. Where another type of rear wheel suspension is employed, the recess 30 may be eliminated and offset members 27 may have a constant cross-section over its full length.

To the rear of offset members 27, the outer rails 26 are provided with a kicked up area 31 to accommodate the rear axle and wheel suspensions, and a usual cross member 32 connects the rails rearwardly.

The shock bar 33 also extends between outer rails 26 forwardly from the crest of the kicked up area 31 and serves to further strengthen and rigidify the rearward frame portion 2. To add further strength and rigidity to the rearward frame portion 2, side rails 24 and 25 are boxed forwardly from the shock bar 33 by means of channel section inner rails 34 having flanges disposed outwardly and joined to the flanges of outer rails 26.

As shown best in Fig. 6, the offset side bars 15 and 16 disposed inwardly of and adjacent the corresponding body side sills 17 and 18 permit the floor 6 extending between the sills to be lowered to the level of minimum ground clearance inwardly of the frame from the rear edge 13 of toe board 12 to the forward edge 22 of rear seat area 23 without restriction by the frame to provide adequate seating with the lowest possible silhouette.

From a design and production standpoint the frame of this invention offers other functional and economical advantages. An offset such as provided in the frame of this invention acts as a crank and inherently causes some deflection in the frame. With the offset members being formed separately, they can be made large and rigid without undue material penalty to reduce such inherent deflection.

In the offset frame of this invention the front and rear portions 1 and 2 are fabricated separately and separate from the intermediate frame portion 4 so that shorter pieces are blanked and assembled. As a result depth, width, and thickness of material may be varied or proportioned with each piece as design would dictate without increasing frame weight or influencing material requirements throughout the length of the frame as is generally necessary with one piece rails. Further, in the case of one piece rails, changes in depth from end to end to suit actual load conditions generally involves a substantial scrap loss. The blanks for the shorter pieces of the offset frame of its invention can be more readily nested to conserve material.

In the case of a sedan type body, the roof and other structural body portions can substantially strengthen and rigidify the frame portions if the body is properly mounted to the frame. For lack of a roof this is, however, generally not true for the convertible type body and the frame itself must supply substantially all bending and torsional values. Conventional practice calls for additions to the single piece rails in the form of extra straps of metal welded to the rails to increase vertical rigidity and the further addition of an X member to provide a large increase in torsional rigidity. Such a procedure is not only costly, but also generally requires chassis modifications and prohibits lowering of floors to the level of minimum ground clearance.

Figure 7:
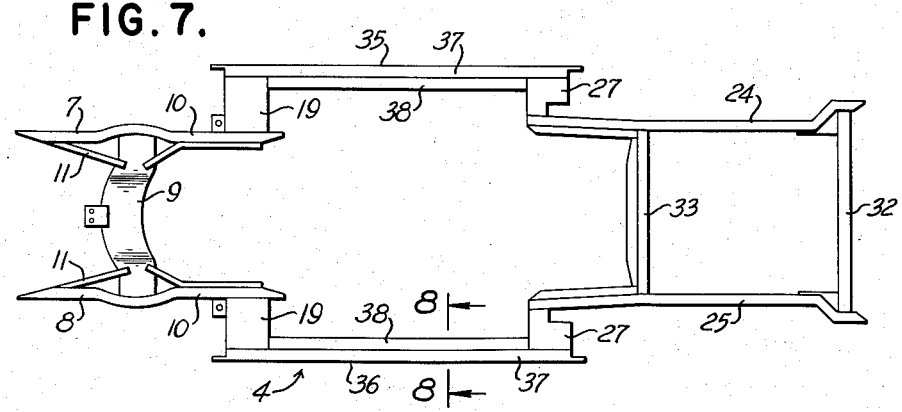
Fig. 7 is a plan view of the frame of the invention showing a modification to accommodate a convertible type body.

As shown in Figure 7, the offset frame of this invention need be modified only in the intermediate frame portion 4 to accommodate a convertible type body. Each of the side bars 35 and 36 comprises a channel section outer rail 37 having a configuration similar to the corresponding channel side bars 15 and 16 of Fig. 1–3, and can be increased substantially in thickness. Additionally, each of the side bars 35 and 36 includes a heavy gauge channel inner rail 38 extending between the front and rear offset members 19 and 27.

Figure 8:
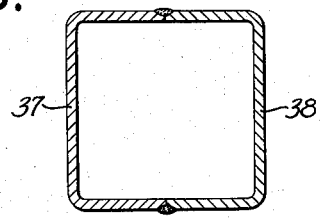
Fig. 8 is an enlarged section taken on line 8—8 of Fig. 7.

As shown in Fig. 8, the channel rails 37 and 38 have their flanges disposed in edge abutting relation and joined by welding to form box-section side bars providing the necessary vertical and torsional rigidity for the convertible type body. This modification does not materially change the fabrication procedure, and, as in the case of the sedan type frame of Figures 1–3, the floor can be lowered clear of the frame to the level of minimum ground clearance and no chassis modifications are needed.

Various modes of carrying out the invention are contemplated as being within the scope of the following claims particularly pointing out and distinctly claiming the subject matter which is regarded as the invention.

I claim:

1. In a vehicle having a separate body and frame with front and rear paired transversely spaced wheels, said body including transversely spaced side sills disposed generally at the level of minimum ground clearance and a floor extending between said sills providing a toe board area and a rear seat area and being carried by said frame, said frame comprising a forward frame section adapted to be received between transversely spaced front wheels and generally being spaced above the level of minimum ground clearance forwardly of the toe board area and having a rearward portion extending angularly downwardly generally under the toe board area at an angle generally corresponding to that of the toe board and terminating at the level of minimum ground clearance at a position forwardly from the rear edge of the toe board area, a rearward frame section adapted to be received between transversely spaced rear wheels and extending rearwardly from a position rearwardly of the front edge of the rear seat area and having a forward portion disposed generally at the level of minimum ground clearance, an intermediate frame section comprising transversely spaced side bars disposed generally at the level of minimum ground clearance and spaced outwardly from the forward and rearward frame sections to positions immediately inwardly of the body sills, said side bars extending forwardly beyond the rear edge of the toe board area and having a forward portion bent upwardly under the toe board area to overlap and generally parallel the rearward portion of the forward frame section and extending rearwardly beyond the front edge of the rear seat area to provide a rearward portion to overlap and generally parallel the forward portion of the rearward frame section, and substantially right angle tubular offset members rigidly connecting the corresponding parallel portions between the side bars and the forward and rearward frame sections, respectively, to complete the frame, said frame being adapted to support the body with the floor entirely out of contact with the frame and providing an intermediate area between the spaced side bars and between the toe board area and rear seat area wherein the floor may be lowered into the frame without obstruction by the frame.

2. The invention of claim 1 wherein the tubular members connecting said corresponding frame sections are disposed at substantially the same angle as the corresponding overlapped portions of the frame sections.

3. The invention of claim 1 wherein the longitudinally overlapping portions of the corresponding frame sections have a given depth and the tubular members extending therebetween have a vertical dimension substantially corresponding to said depth and a dimension taken longitudinally of the frame substantially exceeding said depth.

4. In a vehicle having front and rear paired transversely spaced wheels, the combination with a separate body having side sills and a floor including a toe board area and a rear seat area extending between said sills, a relatively narrow frame portion adapted to be received between transversely spaced front wheels and extending forwardly generally from the rear edge of the toe board area, said forward frame portion comprising transversely spaced channel section outer rails with inwardly disposed flanges and connected by a front cross member, said forward frame portion further including a pair of channel section inner rails with outwardly disposed flanges, each of said inner rails extending forwardly generally from the rear edge of the toe board area and having the flanges thereof secured to the corresponding flanges of the corresponding outer rail to form a box-section rail portion forwardly of the rear edge of the toe board area, a second relatively narrow frame portion adapted to be received between transversely spaced rear wheels and extending rearwardly generally from the front edge of the rear seat area, said rearward frame portion comprising transversely spaced channel section outer rails with inwardly disposed flanges and connected by a rear cross bar, said rearward frame portion further including a pair of channel section inner rails with outwardly disposed flanges, each of said rear inner rails extending rearwardly generally from the front edge of the rear seat area and having the flanges thereof secured to the corresponding flanges of the corresponding outer rail to form a box-section rail portion rearwardly of the front edge of the rear seat area, a relatively wide intermediate frame portion comprising spaced side bars offset outwardly from the forward and rearward frame portions and disposed inwardly of the body sills, said side bars longitudinally overlapping the box-section portions of the forward and rearward rails in the toe board area and rear seat area, respectively, said wide intermediate frame portion being free of transversely extending cross members and longitudinally extending members between the spaced side bars, and a tubular member extending generally at right angles between each overlapped box-section rail portion and the corresponding side bars, each said tubular member having a relatively large cross section with the dimension taken longitudinally of the frame substantially exceeding the vertical dimension thereof to provide connections between the respective frame portions having considerable strength and torsional rigidity adapted to reduce frame deflection due to the offset therebetween.

5. The invention of claim 4 wherein the offset side bars of the intermediate frame portion comprise channel section members having flanges disposed inwardly.

6. The invention of claim 4 wherein the offset side bars of the intermediate frame portion comprise channel section members having flanges disposed inwardly and the vertically spaced sides of the tubular members engage said flanges and are secured thereto, and a second channel section member with outwardly disposed flanges extending between the tubular members and having the flanges thereof secured to the corresponding flanges of the corresponding first-named channel section member to form box-section side bars in the intermediate portion of the frame.

7. In a vehicle having a separate body and frame with front and rear paired transversely spaced wheels, said body including transversely spaced side sills disposed generally at the level of minimum ground clearance and a floor extending between said sills and including a forward toe board area and rear seat area and being carried by said frame, said frame comprising a relatively narrow frame portion adapted to be received between transversely spaced front wheels and extending forwardly generally from the rear edge of the toe board area, said forward frame portion including transversely spaced channel section outer rails with inwardly disposed flanges and connected by a front cross member, said outer rails generally being spaced above the level of minimum ground clearance forwardly of the toe board area and having a rearward portion extending angularly downwardly generally under the toe board area at an angle generally corresponding to that of the toe board and terminating generally at the level of minimum ground clearance at a position forwardly from the rear edge of the toe board area, said forward frame portion further including a pair of channel section inner rails with outwardly disposed flanges, each of said inner rails extending forwardly generally from the rear edge of the toe board area and being similarly contoured to the outer rails and having the flanges thereof secured to the flanges of the corresponding outer rail to form box-section rail portions forwardly of the rear edge of the toe board area, a second relatively narrow frame portion adapted to be received between transversely spaced rear wheels and extending rearwardly generally from the front edge of the rear seat area, said rearward frame portion comprising transversely spaced channel section outer rails with inwardly disposed flanges and connected by a rear cross bar, said rearward outer rails having a forward portion thereof disposed generally at the level of minimum ground clearance, said rearward frame portion further including a pair of channel section inner rails with outwardly disposed flanges, each of said rear inner rails extending rearwardly generally from the front edge of the rear seat area and being similarly contoured to the rear outer rails and having the flanges thereof secured to the flanges of the corresponding outer rail to form box-section rail portions rearwardly of the front edge of the rear seat area, an intermediate frame portion comprising transversely spaced side bars disposed generally at the level of minimum ground clearance and offset outwardly from the forward and rearward frame portions and inwardly of said body sills, said side bars extending forwardly beyond the rear edge of the toe board area and having a forward portion bent upwardly under the toe board area to parallel and longitudinally overlap the rearward portion of the forward frame portion and extending rearwardly beyond the front edge of the rear seat area to provide a rearward portion to parallel and longitudinally overlap the forward portion of the rearward frame portion, and substantially right angle tubular offset members of relatively large cross-section having a dimension taken longitudinally of the frame substantially exceeding the vertical dimension thereof rigidly connecting the box-section rail portions of the forward and rearward frame portions, respectively, to the corresponding parallel and overlapping portions of the respective side bars to provide connections between the respective frame portions having considerable strength and torsional rigidity adapted to reduce frame deflection due to the offset therebetween.

References Cited in the file of this patent

UNITED STATES PATENTS

| | | |
|---|---|---|
| 1,846,567 | Murray | Feb. 23, 1932 |
| 2,551,528 | Darrin | May 1, 1951 |
| 2,669,462 | Toncray | Feb. 16, 1954 |
| 2,746,763 | Nallinger | May 22, 1956 |

OTHER REFERENCES

SAE Journal, April 1956, pages 30 to 31.